March 25, 1924.

V. J. HARRIS

SILENCER

Filed June 10, 1921

1,488,241

INVENTOR.
Vernon J. Harris
BY Raymond A. Parker
ATTORNEY.

Patented Mar. 25, 1924.

1,488,241

UNITED STATES PATENT OFFICE.

VERNON J. HARRIS, OF DETROIT, MICHIGAN.

SILENCER.

Application filed June 10, 1921. Serial No. 476,440.

*To all whom it may concern:*

Be it known that I, VERNON J. HARRIS, a citizen of the United States, residing at Detroit, county of Wayne, State of Michigan, have invented a certain new and useful Improvement in Silencers, and declare the following to be a full, clear, and exact description of the same, such as will enable others skilled in the art to which it pertains to make and use the same, reference being had to the accompanying drawings, which form a part of this specification.

My invention relates to silencing mechanism intended for use in connection with the steering post and steering gear of a motor vehicle.

The object is to provide a silencer so constructed and capable of being applied to the steering post of a motor vehicle so as to eliminate the noise and rattle of the steering post in its mounting and the steering gears driven by the rotation of such post.

A further object is the provision of silencing mechanism comprising means adapted to exert yielding pressure endwise on the steering post of a motor vehicle tending to take up the play in the steering gears and the permitted longitudinal motion of the post relative the gearing casing.

A further object is to provide silencing mechanism of simple, inexpensive construction adapted to be quickly and easily secured to a steering post and so constructed and fitted in place as to exert upward yielding pressure on said steering post relative the steering gear casing so as to take up the play therein and prevent the rattle and noise incident to such free motion.

These and other objects together with details of construction will more fully appear from the following description, appended claims and accompanying drawings, in which:

Figure 1:
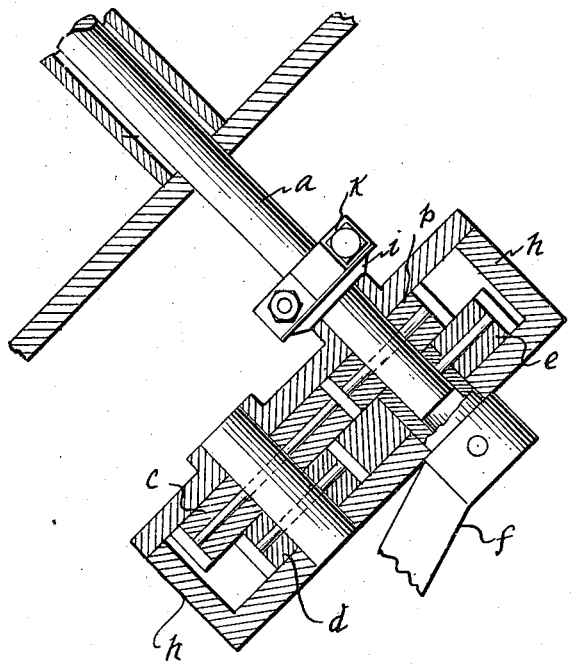
Figure 1 is a section through my device showing the steering rod in elevation.
Figure 3:
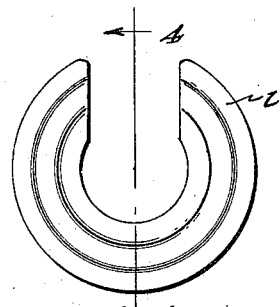
Fig. 3 is a plan of the spring member.
Figure 2:
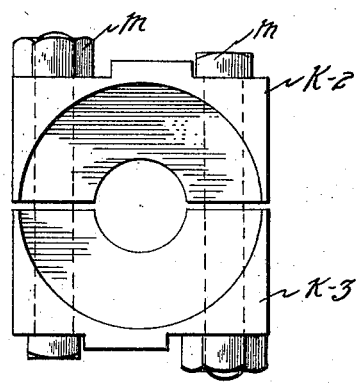
Fig. 2 is a plan of the clamping device.
Figure 4:
Fig. 4 is a section taken on the line 4—4 Fig. 3.

In the drawings let $a$ indicate the steering post which carries one of a set of four re-reduction gears. Pinion $b$ drives a gear $c$ which is mounted on the same shaft as pinion $d$ which pinion $d$ engages the gear $e$. Gear $e$ is secured to the spindle upon which is mounted the steering arm $f$ which connects with the drag link to actuate the steering knuckles in the steering of the vehicle. The reduction gears are enclosed in a casing $h$ in which the steering post is mounted.

Due to the wear on the moving parts, inaccuracies in adjustment at installation, variation incident to the quantity of production, etc., there is nearly always a permitted motion or play longitudinally of the steering post which not only produces noise and rattle but is objectionable to the driver of the vehicle. Previous attempts have been made through the use of various means to eliminate this unnecessary condition.

I have provided a simple device adapted to be easily secured to any conventional type of steering post which is of such a character as to exert constant yielding pressure endwise of the steering post relative its mounting in the steering gear casing. This device comprises a spring member $i$ here shown as of the U or "horse shoe" shape which surrounds the steering post adjacent the gear casing and is held downwardly against said casing by means of a clamp $k$ which is engaged about the steering post thereby causing the spring member to exert an upward yielding pressure on said post.

The clamp $k$ comprises a pair of gripping jaws $k^2$ and $k^3$ held together by means of bolts $m$. In the assembly of this device the spring member is first placed about the steering post. The clamp $k$ is then secured therearound and partially tightened in position. The clamp, with a few light blows of a hammer, is then forced downwardly on the post so as to compress the spring member $i$ between such clamp and the gear casing in order that the spring member may exert an upward pressure on said steering post tending to hold it firmly in its mounting in the casing and to take up the play in the gears.

What I claim is:

1. In combination with the steering post of a motor vehicle and the steering gear casing, a clamping device adjustable on the steering post at a point above the casing, spring means interposed between the clamp and casing and held under tension by the clamp to exert upward pressure on said post relative the casing.

2. In a device of the class described, in combination, a steering post, a steering gear casing in which the post is journaled, a spring member adapted to embrace said post above said casing and seat against the casing, and adjustable securing means adapted to clamp about said post above said spring member and hold the said member against said casing under tension to exert a yielding force on said post longitudinally thereof relative said casing.

3. In a silencer, in combination with a steering gear casing, and a steering post journaled within the casing, a U-shaped spring member adapted to embrace said post and seat against the casing, and clamping means adjustably secured to said post to hold said spring member against said casing under tension to exert yielding endwise pressure upwardly on said post.

In testimony whereof, I sign this specification.

VERNON J. HARRIS.